United States Patent [19]

Maag

[11] Patent Number: 5,698,061
[45] Date of Patent: Dec. 16, 1997

[54] METHOD OF BONDING WOOD MATERIALS USING A COPOLYESTER

[75] Inventor: William Dale Maag, Kingsport, Tenn.

[73] Assignee: Eastman Chemical Company, Kingsport, Tenn.

[21] Appl. No.: 790,122

[22] Filed: Jan. 29, 1997

Related U.S. Application Data

[63] Continuation of Ser. No. 491,340, Jun. 30, 1995, abandoned, which is a continuation-in-part of Ser. No. 168,691, Dec. 16, 1993, abandoned.

[51] Int. Cl.⁶ .................................................. C09J 5/00
[52] U.S. Cl. ............... 156/312; 156/90; 156/244.27; 156/315; 156/324.4; 156/332; 428/481; 528/308.7
[58] Field of Search ............................. 156/312, 332, 156/244.27, 315.9, 324.4; 528/308.7; 428/481; 144/348, 352

[56] References Cited

U.S. PATENT DOCUMENTS

| | | | |
|---|---|---|---|
| 4,352,925 | 10/1982 | Petke et al. | 156/332 |
| 4,450,250 | 5/1984 | McConnell et al. | 156/332 |
| 5,286,545 | 2/1994 | Simmons | 428/481 |

FOREIGN PATENT DOCUMENTS

A 95 16579  6/1995  WIPO.

Primary Examiner—John J. Gallagher
Attorney, Agent, or Firm—Andrew B. Griffis; Harry J. Gwinnell

[57] ABSTRACT

This invention relates to a method for manufacturing laminated decorative plates which do not exhibit bleed through. The method involves laminating at least one side of a veneer with an extruded amorphous or semi-crystalline copolyester film under thermocompression or radio frequency energy at a temperature that does not exceed 75% of the melting point of the copolyester film. The veneer is bonded to core material using the copolyester film which has a melting point of at least 300° F. and is prepared from terephthalic acid and a diol component containing repeat units from 30 to 50 mole percent diethylene glycol and 70 to 50 mole percent ethylene glycol.

16 Claims, No Drawings

METHOD OF BONDING WOOD MATERIALS USING A COPOLYESTER

CROSS-REFERENCE TO RELATED APPLICATION

This is a continuation of application Ser. No. 08/491,340 filed on Jun. 30, 1995, now abandoned, which is a continuation-in-part of application Ser. No. 08/168,691 filed Dec. 16, 1993, now abandoned.

FIELD OF THE INVENTION

This invention relates to a method for manufacturing laminated decorative plates which do not exhibit bleed through. The method involves laminating at least one side of a veneer with an extruded amorphous or semi-crystalline copolyester film under thermocompression or radio frequency energy at a temperature that does not exceed 75% of the melting point of the copolyester film.

BACKGROUND OF THE INVENTION

In recent years, high-quality wood suitable for manufacturing furniture has become scarce. Therefore, laminated decorative plates have become popular since people appreciate the feel of natural wood and the beauty of wood grain. Laminated decorative plates are made by bonding thin sheets of high-quality wood also called veneers to a core material of regular wood, metal or cork, etc., with which furniture is made, in order to offer furniture with the appearance of high-quality wood at a lower price. Veneers are usually made from high-quality wood such as birch or walnut which are tough and flexible and have the ability to adapt to surfaces often less than totally flat. Such high-quality woods, however, are becoming more scarce.

Because of the need for toughness and flexibility in veneers, it has been practically impossible to make use of certain quality woods such as burr and figured cuts and vegetable tissue such as cork since these materials are especially fragile, and often exhibit undulations that cannot be straightened without the veneer breaking up. Such materials are also ultra-delicate, easily chipped, and difficult to work to a smooth surface.

Thermoplastic films which have been used to laminate decorative overlays are described in Jap. Pat. Appl. No. Hira 3-110102, Jap. Pat. Nos. 45-22839 and 61-56104, and in U.S. Pat. Nos. 5,286,545, 5,073,431 and 4,269,883. Jap. Pat. Appl. No. Hira3-110102 discloses a method of bonding wood materials using a thermoplastic resin wherein wood materials are bonded by carrying out thermocompression in a temperature range corresponding to 95–80% of the melting point of the thermoplastic resin. Jap. Pat. Appl. No. Hira3-110102 warns that when thermocompression is carried out at a temperature below 80% of the melting point, the fluidity of the thermoplastic resin is insufficient and a long time is required. In contrast, the copolyester film of the present invention is thermocompressed at a temperature less than 75% of the melting point to prevent scorching of the wood.

Jap. Pat. No. 45-22839 discloses a method for manufacturing laminated decorative plates involving laminating strips of high quality face veneer laid side-by-side in series onto a core plywood using a thermoplastic adhesive film. Jap. Pat. Appl. No. 45-22839 states that the thermoplastic resin film is prepared from vinyl chloride, polyethylene or polypropylene. Jap. Pat. No. 61-56104 discloses a method to reinforce thin wood veneers by coating the face veneer with a thermosetting resin, laminating with paper, coating with another thermosetting resin, and then curing the laminated structure. This method has three major disadvantages. The method involves multiple steps. The resin impregnated paper requires moisture from the face veneer and the plywood core to activate its adhesive properties. Not only does this require a "wet" face veneer and plywood core, but if the resin impregnated paper is exposed to high humidities while still rolled up, it will adhere to itself and become impossible to unroll without damage to the paper. In contrast, the method of the present invention requires only one step. In addition, the copolyester film of the present invention will not flow between the arranged pieces of face veneer, does not require moisture for adhesion, does not-block on the roll in high humidities, and is generally tough and non-brittle.

U.S. Pat. No. 5,286,545 discloses a method for laminating wooden board products using a low melt polyester with melting point preferably of 200°–275° F. U.S. Pat. No. 5,286,545 teaches that the polyesters should have a melting point of 200°–275° F. to act as an adhesive and bond wood materials. In contrast, applicant's polyester has a melting point of at least 300° F. Bonding applicant's polyester at the conditions taught by U.S. Pat. No. 5,286,545 would either result in "bleed through" of the adhesive resin through the wooden face veneer or starved glue lines.

U.S. Pat. No. 4,269,883 discloses a method for reinforcing a wood veneer sheet, by sewing a cord or thread of material into the veneer perpendicular to the grain of the veneer. If the cord is a thread of natural fiber, it is impregnated with an adhesive such as a thermoplastic resin and subjected to pressing to set the projecting portions. U.S. Pat. No. 5,073,431 discloses a method of producing multi-ply laminates incorporating an exposed veneer in quality wood or cork involving bonding the veneer to a thin flexible thermoplastic film by way of a layer hot melt adhesive. The same laminate is reinforced by adding a tough, close-woven backing fabric bonded to the back of the film via a further layer of adhesive.

SUMMARY OF THE INVENTION

The method of the present invention for manufacturing laminated decorative plates which do not exhibit bleed through, said method comprising: laminating at least one side of a veneer with an extruded amorphous or semi-crystalline copolyester film under thermocompression or radio frequency energy at a temperature that does not exceed 75% of the melting point of the copolyester film; and bonding the veneer to core material with the extruded amorphous or semi-crystalline copolyester film under thermocompression or radio frequency energy at a temperature that does not exceed 75% of the melting point of the copolyester film to form a laminated decorative plate, wherein the copolyester film is between the veneer and the core material, said copolyester film having a melting point of at least 300° F. comprising:

(1) a dicarboxylic acid component comprising repeat units from at least 90 mole percent terephthalic acid; and (2) a diol component comprising repeat units from 30 to 50 mole percent diethylene glycol and 70 to 50 mole percent ethylene glycol, based on 100 mole percent dicarboxylic acid and 100 mole percent diol.

Description of the Invention

The copolyester of the present invention is an amorphous or semi-crystallizable copolyester which is extruded into a film. The copolyester film may be applied to a veneer or core material. Core materials which the copolyester film adheres to include wood such as burr and figured cuts, vegetable tissue such as cork, metal such as aluminum and steel, hardboard, chipboard, particle board, paper, veneer, glass fiber, and wood-fiber, when heated or contacted with radio frequency energy. In order to prevent scorching of the veneer, the thermocompression temperature should not exceed 75% of the melting point of the thermoplastic resin. Preferably, the thermocompression temperature is 50% to 60% of the melting point of the thermoplastic resin.

The copolyester contains repeat units from at least 90 mole percent terephthalic acid, 30 to 50 mole percent diethylene glycol, and 70 to 50 mole percent ethylene glycol, based on 100 mole percent dicarboxylic acid and 100 mole percent diol. The dicarboxylic acid component of the copolyester may optionally be modified with up to 10 mole percent of one or more different dicarboxylic acids other than terephthalic acid or suitable synthetic equivalents such as dimethyl terephthalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. Copolyesters may be prepared from one or more of the above dicarboxylic acids.

It should be understood that use of the corresponding acid anhydrides, esters, and acid chlorides of these acids is included in the term "dicarboxylic acid".

In addition, the copolyester may optionally be modified with up to 5 mole percent, of one or more different diols other than ethylene glycol and diethylene glycol. Such additional diols include cycloaliphatic diols preferably having 6 to 20 carbon atoms or aliphatic diols preferably having 3 to 20 carbon atoms. Examples of such diols to be included with ethylene glycol and diethylene glycol are: triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2, 4-trimethylpentane-diol-(1,3), 2-ethylhexane-diol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxy-phenyl)-propane, and 2,2-bis-(4-hydroxypropoxyphenyl)-propane. Copolyesters may be prepared from two or more of the above diols.

The copolyester has an inherent viscosity of 0.4 to 1.5 dl/g, preferably 0.5 to 0.9 dl/g. Copolyesters containing substantially only diethylene glycol, ethylene glycol and terephthalic acid are preferred. Preferably, the diol portion of the copolyester contains 32 to 40 mole percent diethylene glycol and 68 to 60 mole percent ethylene glycol.

If the diethylene glycol content is less than 30 mole percent, the melting point of the copolyesters is too high to be reactivated by thermocompressing at 400° F. If the diethylene glycol content is greater than 50 mole percent, the glass transition temperature is too low, making the copolyesters difficult to handle in bulk and coated form.

The copolyesters of the present invention can be prepared by conventional polycondensation procedures well-known in the art. Such processes include direct condensation of the dicarboxylic acid(s) with the diols or by ester interchange using a dialkyl dicarboxylate. For example, dimethyl terephthalate is ester inter-changed with the diols at elevated temperatures in the presence of a catalyst. Typical polyesterification catalysts which may be used include titanium alkoxides, dibutyl tin dilaurate, and combinations of zinc, manganese or magnesium acetates or benzoates with antimony oxide or antimony triacetate. The copolyesters may also be subjected to solid state polymerization methods.

Many other ingredients can be added to the copolyesters of the present invention to enhance the performance properties of the copolyesters. For example, antioxidants, denesting agents, antiblocking agents, metal deactivators, colorants, phosphate stabilizers, mold release agents, fillers such as talc and formica, silica, glass beads, glass fibers, nucleating agents, ultraviolet light and heat stabilizers, lubricants, flame retardants and the like, can be included herein. All of these additives and the use thereof are well known in the art. Any of these compounds can be used as long as they do not deleteriously effect the physical, mechanical, or adhesive properties of the copolyesters.

The thermoplastic film of the present invention is laminated to a face veneer under heat and pressure or optionally by radio frequency energy. The face veneer/thermoplastic film laminate may optionally be pressed to the plywood core using a liquid thermoset adhesive. The thermoplastic film may consist of multilayers and multimaterials. The film may be a coextrusion or lamination of thermoplastics. The film must have good adhesion to the wooden substrates and liquid thermoset adhesives, but be impervious to attack from the liquid adhesives and prevent migration of the liquid adhesive through it.

The copolyester films of the present invention are especially useful in the production of decorative plywood wherein a high quality decorative veneer is laminated to the surface of plywood core to be used for construction, paneling, and furniture manufacture. The decorative veneer can be printed paper or an aesthetically pleasing hardwood veneer. The copolyester films of the present invention can be applied to all sides of a veneer to protect the veneer against mars, scratches, and soiling.

In the production of decorative plywood, the surface of the panel is required to be flat and smooth. Since the wooden face veneers of decorative plywood panels are $\frac{1}{30}$" or thinner, any roughness found on the surface of the outermost core veneer will be telegraphed to the surface. Consequently, an unsanded core veneer will have rough saw cut marks and the like on the surface, and when a very thin face veneer is laminated under heat and pressure to the surface of this rough cut core veneer, the surface defects will show on the surface of the face veneer. The copolyester film of this invention may be used to fill in rough core veneer, and thus, eliminate telegraphing.

A veneer may be laminated to the thermoplastic films of this invention under heat and pressure for a specified period of time. Alternatively, a veneer may be laminated to the thermoplastic films using radio frequency energy. It is also possible to use a multiple layer copolyester film, wherein one layer acts as a structural support and another layer acts as an adhesive between the structural layer and the substrate. The multilayer film may also have an adhesive layer on a side which is opposite the face veneer for later lamination to a core.

The preferred method of this invention is to press the copolyester film directly to the face veneer and then to press the film/veneer laminate to the core. Optionally, a thermosetting adhesive emulsion is applied to the core or to the side of the copolyester film which will be pressed against the core. A thermosetting adhesive emulsion would not be used between the veneer and the copolyester film.

The materials and testing procedures used for the results shown herein are as follows:

Copolyester A is a copolyester consisting of 100 mole percent terephthalic acid, 63 mole percent ethylene glycol and 37 mole percent diethylene glycol having an I.V. of 0.77 dl/g, a melting point of 178° C., and a Tg of 55° C.

Copolyester B is a copolyester consisting of 100 mole percent terephthalic acid, 82 mole percent ethylene glycol and 18 mole percent diethylene glycol having an I.V. of 0.77 dl/g, a melting point of 220° C., and a Tg of 65° C.

Copolyester C is a copolyester consisting of 100 mole percent terephthalic acid, 34 mole percent ethylene glycol and 66 mole percent diethylene glycol having an I.V. of 0.75 dl/g and a Tg of 40° C. (104° F.), Tm=none.

Copolyester D is an amorphous copolyester consisting of 100 mole percent terephthalic acid, 69 mole percent ethylene glycol and 31 mole percent 1,4-cyclohexanedimethanol having an I.V. of 0.75 dl/g and a Tg of 81° C. (178° F.), Tm=none.

Copolyester E is a copolyester consisting of 100 mole percent terephthalic acid, 96.5 mole percent ethylene glycol and 3.5 mole percent 1,4-cyclohexane-dimethanol having an I.V. of about 0.75 dl/g, a melting point of 250° C., and a Tg of 75° C.

Copolyester F is a copolyester consisting of 100 mole percent terephthalic acid, 55 mole percent ethylene glycol and 45 mole percent diethylene glycol having an I.V. of 0.76 dl/g and a Tg of 47° C. 55° C. (131° F.), Tm=none.

Copolyester G is an amorphous copolyester consisting of 100 mole percent terephthalic acid, 31 mole percent ethylene glycol and 69 mole percent 1,4-cyclohexanedimethanol having an I.V. of 0.74 dl/g and a Tg of 85° C. (183° F.), Tm=255° C. (491° F.)

Adhesion was determined according to the Hardwood Plywood Veneer Association (HPVA) HP-1, 1993, 3 Cycle Soak Test.

Elmendorf tear test is described in ASTM D1922.

Inherent viscosity (I.V.) was measured at 25° C. using 0.50 grams of polymer per 100 ml of a solvent consisting of 60% by weight phenol and 40% by weight tetrachloroethane.

Melting point (Tm) of the polyesters was determined with a Differential Scanning Calorimeter (DSC).

The invention will be further illustrated by a consideration of the following examples, which are intended to be exemplary of the invention. All parts and percentages in the examples are on a weight basis unless otherwise stated.

EXAMPLE I

A sheet of 0.85 mm maple face veneer quality wood was cut into 100 mm×100 mm pieces. A piece of 100 mm×100 mm×0.076 mm Copolyester A film was laminated to the wood veneer at 250 psi and 240° F. for 4 minutes. The Copolyester A/veneer laminate demonstrated a Elmendorf tear value of greater than 1600 grams in the direction of the grain and a tear value of approximately 435 grams in the direction perpendicular to the grain of the wood. The copolyester A/veneer laminate was laminated to a ¾" Douglas fir plywood core at 260 psi for 1.5 minutes at 240° F. The panel passed the 3 Cycle Soak Test.

EXAMPLE II

A sheet of 0.85 mm maple face veneer quality wood was cut into 100 mm×100 mm pieces. A piece of 100 mm×100 mm×0.076 mm Copolyester B film was laminated to the wood veneer at 250 psi and 240° F. for 4 minutes. The Copolyester B/veneer laminate demonstrated a Elmendorf tear value of 1600 grams in the direction of the grain and a tear value of approximately 435 grams in the direction perpendicular to the grain of the wood. The Copolyester B/veneer laminate was laminated to a ¾" Douglas fir plywood core at 260 psi for 1.5 minutes at 240° F. The panel did not pass the 3 Cycle Soak Test.

EXAMPLE III

A sheet of 0.85 mm maple face veneer quality wood was cut into 100 mm×100 mm pieces. A piece of 100 mm×100 mm×0.076 mm Copolyester C film was laminated to the wood veneer at 250 psi and 240° F. for 4 minutes. The Copolyester C/veneer laminate demonstrated a Elmendorf tear value of 1300 grams in the direction of the grain and a tear value of approximately 200 grams in the direction perpendicular to the grain of the wood. The Copolyester C/veneer laminate was laminated to a ¾" Douglas fir plywood core at 260 psi for 1.5 minutes at 240° F. The panel did not pass the 3 Cycle Soak Test.

EXAMPLE IV

A sheet of 0.85 mm maple face veneer quality wood was cut into 100 mm×100 mm pieces. A piece of 100 mm×100 mm×0.076.mm Copolyester D film was laminated to the wood veneer at 250 psi and 240° F. for 4 minutes. While the Copolyester D/veneer laminate demonstrated a Elmendorf tear value of 1600 grams in the direction of the grain and a tear value of approximately 300 grams in the direction perpendicular to the grain of the wood, the Copolyester D/veneer partially delaminated during tear testing. The Copolyester D/veneer laminate was laminated to a ¾" Douglas fir plywood core at 260 psi for 1.5 minutes at 240° F. The panel did not pass the 3 Cycle Soak Test.

EXAMPLE V

A sheet of 0.85 mm maple face veneer quality wood was cut into 100 mm×100 mm pieces. A piece of 100 mm×100 mm×0.076 mm Copolyester E film was laminated to the wood veneer at 250 psi and 240° F. for 4 minutes. The Copolyester E/veneer laminate delaminated during tear testing. The Copolyester E/veneer laminate was laminated to a ¾" Douglas fir plywood core at 260 psi for 1.5 minutes at 240° F. The panel did not pass the 3 Cycle Soak Test.

EXAMPLE VI

A sheet of 0.85 mm maple face veneer quality wood was cut into 100 mm×100 mm pieces. A piece of 100 mm×100 mm×0.076 mm Copolyester F film was laminated to the wood veneer at 250 psi and 240° F. for 4 minutes. The Copolyester F/veneer laminate demonstrated a Elmendorf tear value of 1600 grams in the direction of the grain and a tear value of approximately 400 grams in the direction perpendicular to the grain of the wood. The Copolyester F/veneer laminate was laminated to a ¾" Douglas fir plywood core at 260 psi for 1.5 minutes at 240° F. The panel passed the 3 Cycle Soak Test.

EXAMPLE VII

A sheet of 0.85 mm maple face veneer quality wood was cut into 100 mm×100 mm pieces. A piece of 100 mm×100 mm×0.076 mm Copolyester G film was laminated to the wood veneer at 250 psi and 240° F. for 4 minutes. The Copolyester E/veneer laminate delaminated during tear testing. The Copolyester E/veneer laminate was laminated to a ¾" Douglas fir plywood core at 260 psi for 1.5 minutes at 240° F. The panel did not pass the 3 Cycle Soak Test.

EXAMPLE VIII

A sheet of 0.85 mm maple face veneer quality wood was cut into 100 mm×100 mm pieces. The wood veneer demonstrated a Elmendorf tear strength value of 120 grams in the direction of the grain and a tear strength value of approximately 67 grams in the direction perpendicular to the grain of the wood. Such values are much lower than wood veneer treated with the copolyester film of the present invention.

EXAMPLE IX

A sheet of 0.85 mm maple face veneer quality wood was cut into 100 mm×100 mm pieces. The wood was laminated with a thermoplastic polymer, 0.101 mm anhydride-modified ethylene vinyl acetate film, having a melt index of approximately 2.5 g/min. at 250 psi and 240° F. for 4 minutes. The melt index was determined at 190° C. according to ASTM D1238.

The wood veneer/film laminate demonstrated a Elmendorf tear value of 1600 grams in the direction of the grain and a tear value of approximately 330 grams in the direction perpendicular to the grain of the wood. The anhydride-modified ethylene vinyl acetate/veneer laminate was laminated to a ¾" Douglas fir plywood core at 260 psi for 1.5 minutes at 240° F. The panel did not pass the 3 Cycle Soak Test.

EXAMPLE X

A sheet of 0.127 mm maple face veneer quality wood and a sheet of 18 mm thick 5-layer plywood core were cut into 100 mm×100 mm pieces. A 100 mm×100 mm×0.051 mm Copolyester A film was pressed between the face veneer and plywood core at 250 psi and 240° F. for 2 minutes. The face veneer showed no bleed through.

EXAMPLE XI

A sheet of 0.127 mm maple face veneer quality wood and a sheet of 18 mm thick 5-layer plywood core were cut into 100 mm×100 mm pieces were pressed at 250 psi and 240° F. for 2 minutes using a glue line emulsion consisting of 51% urea-formaldehyde resin, 25.5% flour, 0.5% aluminum chloride catalyst, and 23% water. Bleed through was identified at several areas of the face veneer.

EXAMPLE XII

A sheet of 0.127 mm maple face veneer quality wood and a sheet of 18 mm thick 5-layer plywood core were cut into 100 mm×100 mm pieces. A 100 mm×100 mm×0.051 mm Copolyester A film and a glue line emulsion consisting of 51% urea-formaldehyde resin, 25.5% flour, 0.5% aluminum chloride catalyst, and 23% water were pressed between the face veneer and plywood core at 250 psi and 240° F. for 2 minutes. The face veneer, Copolyester A film, emulsion, and plywood core were stacked in that order. The stack was pressed at 250 psi and 240° F. for 2 minutes. No bleed through was observed on the face veneer surface.

EXAMPLE XIII 13 plies of maple quality wood were cut into 100 mm×100 mm×1.67 mm pieces which were stacked with 100 mm×100 mm×0.051 mm Copolyester A film between each ply. The copolyester A film/veneer stack was treated with radio frequency energy, 200 psi, 13.5 kV at 27 MHz for 3.5 minutes. The panel passed the 3 Cycle Soak Test. In addition no bleed through was observed.

The examples clearly show that only films prepared from amorphous or semi-crystallizable copolyesters containing repeat units from at least 90 mole percent terephthalic acid, 30 to 50 mole percent diethylene glycol, and 70 to 50 mole percent ethylene glycol, as opposed to other thermoplastic polymer films, act as adhesives to bond veneer to core material.

In addition, the copolyester films of the present invention do not exhibit bleed through as is present with liquid thermoset adhesives. The examples also indicate that veneer can be bonded to core material by thermocompression or by radio frequency energy at a temperature that does not exceed 75% of the melting point of the copolyester film. Moreover, the examples show that the copolyester films of this invention prevent cracking or chipping of the veneer. Thus, the method of the present invention allows thin, delicate or fragile woods to be used as veneers for laminated decorative plates.

Many variations will suggest themselves to those skilled in this art in light of the above detailed description. All such obvious modifications are within the full intended scope of the appended claims.

What is claimed is:

1. A method for manufacturing laminated decorative plates which do not exhibit bleed through, said method comprising:

laminating at least one side of a veneer with an extruded semi-crystalline copolyester film under thermocompression or radio frequency energy at a temperature that does not exceed 75% of the melting point of the copolyester film;

and bonding the veneer to core material with the extruded semi-crystalline copolyester film under thermocompression or radio frequency energy at a temperature that does not exceed 75% of the melting point of the copolyester film to form a laminated decorative plate, wherein the copolyester film is between the veneer and the core material, said copolyester having a melting point of at least 300° F., and said copolyester comprising:

(1) a dicarboxylic acid component comprising repeat units from at least 90 mole percent terephthalic acid; and (2) a diol component comprising repeat units from 30 to 50 mole percent diethylene glycol and 70 to 50 mole percent ethylene glycol, based on 100 mole percent dicarboxylic acid and 100 mole percent diol.

2. A method for manufacturing laminated decorative plates which do not exhibit bleed through, said method comprising:

laminating at least one side of a veneer with an extruded semi-crystalline copolyester film under thermocompression or radio frequency energy at a temperature that does not exceed 75% of the melting point of the copolyester film;

and bonding the veneer to core material with the extruded semi-crystalline copolyester film under thermocompression or radio frequency energy at a temperature that does not exceed 75% of the melting point of the copolyester film to form a laminated decorative plate, wherein the copolyester film is between the veneer and the core material, said copolyester having a melting point of at least 300° F., and said copolyester comprising:

(1) a dicarboxylic acid component consisting of repeat units from terephthalic acid; and
(2) a diol component consisting essentially of repeat units from 35 to 45 mole percent diethylene glycol and 65 to 45 mole percent ethylene glycol, based on 100 mole percent dicarboxylic acid and 100 mole percent diol.

3. The method according to claim 1, wherein the dicarboxylic acid component further comprises repeat units from up to 10 mole percent of a dicarboxylic acid selected from the group consisting of phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid.

4. The method according to claim 1, wherein the veneer is of a thickness between 0.1 mm to 0.9 mm, and the copolyester film is of a thickness between 0.05 mm to 0.25 mm.

5. A method for manufacturing laminated decorative plates including a veneer and a core material comprising:

laminating a veneer to a core material with a copolyester, under thermocompression or radio frequency energy, at a temperature that does not exceed 75% of the melting point of the copolyester;

said copolyester having a melting point of at least 300° F. and comprising:

(1) a dicarboxylic acid component comprising repeat units from at least 90 mole percent terephthalic acid; and
(2) a diol component comprising repeat units from 30 to 50 mole percent diethylene glycol and 70 to 50 mole percent ethylene glycol, based on 100 mole percent dicarboxylic acid and 100 mole percent diol.

6. The method according to claim 5, wherein said core material is selected from the group consisting of wood, vegetable tissue, metal, hardboard, chipboard, particle board, paper, veneer, glass fiber, and wood-fiber.

7. The method according to claim 5, wherein said laminating comprises extruding said polyester into a film, applying said film to said veneer to form a film/veneer laminate and then pressing the film/veneer laminate to said core material under thermocompression.

8. The method according to claim 7, wherein said core material is selected from the group consisting of wood, vegetable tissue, metal, hardboard, chipboard, particle board, paper, veneer, glass fiber, and wood-fiber.

9. The method according to claim 5, wherein said copolyester consists essentially of diethylene glycol, ethylene glycol, and terephthalic acid.

10. The method according to claim 5, wherein said core material is plywood.

11. The method according to claim 7, further comprising applying a thermosetting adhesive emulsion to said core.

12. The method according to claim 7, further comprising applying a thermosetting adhesive emulsion to said film/veneer laminate.

13. The method according to claim 5, wherein said copolyester consists of 100 mole percent terephthalic acid, 63 mole percent ethylene glycol, and 37 mole percent diethylene glycol, having a melting point of 350° F.

14. The method according to claim 5, wherein said copolyester is extruded into a film, said film is laminated to said veneer for 4 minutes at 240° F. to form a film/veneer laminate, and said film/veneer laminate is laminated to a core material at 240° F. for about 1.5 minutes.

15. The method according to claim 5, wherein said laminating occurs at from 50% to 60% of the melting point of the copolyester.

16. The method according to claim 7, wherein said laminating occurs at from 50% to 60% of the melting point of the copolyester.

* * * * *